(12) United States Patent
Sudo et al.

(10) Patent No.: US 9,006,323 B2
(45) Date of Patent: Apr. 14, 2015

(54) DISPERSION CONTAINING FLAME-RESISTANT POLYMER, FLAME-RESISTANT FIBER, AND CARBON FIBER

(75) Inventors: Masafumi Sudo, Ehime (JP); Daisuke Kawakami, Ehime (JP); Tomihiro Ishida, Ehime (JP)

(73) Assignee: Toray Industries, Inc. (JP)

( * ) Notice: Subject to any disclaimer, the term of this patent is extended or adjusted under 35 U.S.C. 154(b) by 840 days.

(21) Appl. No.: 12/745,566

(22) PCT Filed: Dec. 19, 2007

(86) PCT No.: PCT/JP2007/074375
§ 371 (c)(1),
(2), (4) Date: Jun. 14, 2010

(87) PCT Pub. No.: WO2009/078099
PCT Pub. Date: Jun. 25, 2009

(65) Prior Publication Data
US 2010/0278716 A1    Nov. 4, 2010

(51) Int. Cl.
| | | |
|---|---|---|
| B60C 1/00 | (2006.01) | |
| C09D 133/18 | (2006.01) | |
| C08K 5/098 | (2006.01) | |
| C08K 5/092 | (2006.01) | |
| C08K 5/00 | (2006.01) | |
| C08K 5/095 | (2006.01) | |
| D01F 6/18 | (2006.01) | |
| D01F 9/22 | (2006.01) | |

(52) U.S. Cl.
CPC .............. *C09D 133/18* (2013.01); *C08K 5/098* (2013.01); *C08K 5/092* (2013.01); *C08K 5/0091* (2013.01); *C08K 5/095* (2013.01); *C08K 5/0066* (2013.01); *C08L 2203/12* (2013.01); *C08L 2201/02* (2013.01); *D01F 6/18* (2013.01); *D01F 9/22* (2013.01)

(58) Field of Classification Search
CPC ............ D01F 9/22; D01F 9/225; D01F 6/18; C09D 133/18; C08L 2201/02; C08L 33/20; C08L 2203/12; C08K 5/0066; C08K 5/092; C08K 5/095; C08K 5/098; C08K 5/0091
See application file for complete search history.

(56) References Cited

U.S. PATENT DOCUMENTS 6,497,953 B1 * 12/2002 Yu et al. .................. 428/372
7,655,716 B2    2/2010 Higuchi et al.

FOREIGN PATENT DOCUMENTS

| JP | 62-057723 B | 12/1987 |
|---|---|---|
| JP | 63-014093 B | 3/1988 |
| JP | 1-306619 A | 12/1989 |
| JP | 9-143824 A | 6/1997 |
| JP | 2007-063526 A | 3/2007 |
| JP | 2007-182657 A | 7/2007 |
| JP | 2007-204880 A | 8/2007 |
| JP | 2007-321085 A | 12/2007 |
| WO | 2005/080448 A1 | 9/2005 |

OTHER PUBLICATIONS

N.A. Kubasova et al., "Thermal Conversion of Polyacrylonitrile (PAN) in Solution," Polymer Science (USSR), 1968, vol. 10, pp. 1537-1542.
T. Takahagi et al., "XPS Studies on the Chemical Structure of the Stabilized Polyacrylonitrile Fiber in the Carbon Fiber Production Process," Journal of Polymer Science: Part A: Polymer Chemistry, 1986, vol. 24, pp. 3101-3107.
Wen-Yen Chiang et al., "Studies of Reactions with Polymers. VI. The Modification of PAN with Primary Amines," Journal of Polymer Science: Part A: Polymer Chemistry, 1990, vol. 28, pp. 1623-1636.

* cited by examiner

*Primary Examiner* — Peter D Mulcahy
(74) *Attorney, Agent, or Firm* — DLA Piper LLP (US)

(57) ABSTRACT

A dispersion contains a flame-resistant polymer, which can improve shaping stability of the flame-resistant polymer during ejection from a die orifice, and physical stability of a shaped product in a washing step. The dispersion containing a flame-resistant polymer is a dispersion in which a flame-resistant polymer is dispersed in an organic solvent, an in-water tensile strength thereof per unit cross-sectional area is 1.0 MPa or more and 6.5 MPa or less, the flame-resistant polymer can be preferably obtained by heat-treating an acrylonitrile polymer in the presence of at least one kind of acid, acid anhydride or acid chloride in an organic solvent, and a suitable organic solvent is a polar organic solvent.

4 Claims, No Drawings

DISPERSION CONTAINING FLAME-RESISTANT POLYMER, FLAME-RESISTANT FIBER, AND CARBON FIBER

RELATED APPLICATIONS

This is a §371 of International Application No. PCT/JP2007/074375, with an international filing date of Dec. 19, 2007 (WO 2009/078099 A1, published Jun. 25, 2009), the subject matter of which is incorporated by reference.

TECHNICAL FIELD

This disclosure relates to a dispersion containing a flame-resistant polymer, and a flame-resistant fiber obtained by shaping the same, and a carbon fiber obtained by carbonizing the flame-resistant fiber.

BACKGROUND

Since a flame-resistant fiber is excellent in heat resistance and flame resistance, it is widely utilized, for example, in a spatter sheet for protecting a human body from high-heat iron powder flying at welding work, or a welding spark and, further, in a flameproof heat insulating material of an aircraft, and a demand for the flame-resistant fiber in those fields is increasing.

In addition, the flame-resistant fiber is also important as an intermediate raw material for obtaining a carbon fiber. The carbon fiber is widely used in various utilities, for example, aviation/space aeronautical materials such as aircrafts and rockets, and sports goods such as tennis rackets, golf shafts and fishing rods and further, is going to be used in transportation machinery utility fields of ships and automobiles, because of excellent dynamical properties, various chemical properties and lightness. Furthermore, in recent years, application to electronic instrument parts such as cases of mobile phones and personal computers, and electrode utilities of fuel cells is strongly demanded, because of high electrical conductivity and heat radiation properties of the carbon fiber.

The carbon fiber is generally obtained by heating a flame-resistant fiber at a high temperature in an inert gas such as nitrogen, and carbonization-treating the fiber. Further, a conventional flame-resistant fiber, for example, a polyacrylonitrile (PAN) flame-resistant fiber is obtained by subjecting a PAN precursor fiber to a flame-resisting reaction (cyclization reaction+oxidation reaction of PAN) at a high temperature of 200 to 300° C. in an air. This flame-resisting reaction is an exothermal reaction, and is a reaction in a fiber form, that is, in a solid phase state. For this reason, long time treatment is necessary for temperature control and, to complete flame-resisting in a desired time, it is necessary to limit a single fiber fineness of the PAN precursor fiber to a small fineness of a specified value or less. Thus, it cannot be said that the currently known flame-resisting process is a sufficiently effective process.

As one method of solving the aforementioned technical problems, solutionization with a solvent was being studied. For example, the technique of heat-treating an acrylonitrile polymer powder in an inert atmosphere until the density is 1.20 g/cm$^3$ or more, dissolving it in a solvent to fiberize it, and heat-treating the resulting fibrous material has been proposed (see JP-B No. 63-14093). However, since this proposal uses an acrylonitrile polymer powder, a flame-resisting reaction of which has not proceeded, there is a problem that change in a viscosity of the solution with time is great, and yarn breaking easily occurs frequently. In addition, since as a solvent, a strongly acidic solvent such as sulfuric acid and nitric acid which easily discomposes a general organic polymer is used, it is necessary to use an apparatus of a special material having anti-corrosion, being not practical from a view point of a cost.

In addition, a method of mixing a heat-treated acrylonitrile-base polymer powder and a not heat-treated acrylonitrile polymer powder to dissolve the mixture in an acidic solvent similarly has been proposed (see JP-B No. 62-57723), but a problem of impartation of anti-corrosion to the apparatus, and instability of a solution remained unsolved.

Further, a method of heat-treating a solution of polyacrylonitrile in dimethylformamide to convert polyacrylonitrile into a polymer with a cyclized structure has been proposed (see Polymer Science (USSR), 1968, Vol. 10, pp 1537-1542). However, in this proposal, since a polymer concentration is 0.5%, being a dilute solution, and a viscosity is too low, shaping and molding into a substantial fiber are difficult and, when one tries to increase the concentration, a polymer is precipitated, and use as a solution was impossible.

In addition, a solution obtained by modifying polyacrylonitrile with a primary amine has been proposed (see Journal of Polymer Science: Part A: Polymer Chemistry, 1990, Vol. 28, pp 1623-1636), but this solution imparts hydrophilicity to polyacrylonitrile itself, flame-resisting of which has not progressed, and technical idea is entirely different from a flame-resistant polymer-containing solution.

We succeeded in obtaining a dispersion containing a flame-resistant polymer which can be shaped into yarns or films, by reacting polyacrylonitrile using a nucleophile and an oxidizing agent in a polar solvent, and have already proposed this (see WO 2005/080448 A1).

As one means to further improve productivity of a flame-resistant product obtained by this method, improvement in stability in a step of producing a shaped body, particularly, production stability in a coagulating step including a coagulation site for shaping into a yarn shape, and a washing site for removing a chemical and a solvent remaining in a yarn is expected.

It could therefore be helpful to provide a dispersion containing a flame-resistant polymer which can improve shaping stability of the flame-resistant polymer during ejection from a die orifice, and physical stability of a shaped product in a washing step.

SUMMARY

We thus provide a dispersion containing a flame-resistant polymer which is a dispersion in which a flame-resistant polymer is dispersed in an organic solvent, wherein a tensile strength of the flame-resistant polymer per cross-sectional area in water is 1.0 MPa or more and 6.5 MPa or less.

According to a preferable aspect of the dispersion containing a flame-resistant polymer, the organic solvent is a polar organic solvent.

According to a preferable aspect of the dispersion containing a flame-resistant polymer, the flame-resistant polymer is obtained by heat-treating an acrylonitrile polymer. In the heat treatment, when the dispersion in which an acrylonitrile polymer is dispersed in a polar organic solvent is heat-treated, it is preferable to add at least one kind of acid, acid anhydride or acid chloride, and it is preferable that the total addition amount of those acid, acid anhydride and acid chloride is in a range of 0.05 part by weight to 7.0 parts by weight based on 10.0 parts by weight of the acrylonitrile polymer.

According to a preferable aspect of the dispersion containing a flame-resistant polymer, the acid is a carboxyl acid or a sulfonic acid, and examples of the carboxylic acid include a monocarboxylic acid such as benzoic acid, hydroxybenzoic acid, methylbenzoic acid and aminobenzoic acid, and a dicarboxylic acid such as phthalic acid, isophthalic acid, and terephthalic acid. Examples of the sulfonic acid include methanesulfonic acid, toluenesulfonic acid, and an aminosulfonic acid such as taurine, sulfanilic acid, and orthanilic acid.

The dispersion containing a flame-resistant polymer can be shaped into a flame-resistant fiber, and the flame-resistant fiber can be carbonized to produce a carbon fiber.

A dispersion containing a flame-resistant polymer in which release from an ejection port is remarkably good upon shaping of the dispersion containing a flame-resistant polymer is obtained. In this dispersion containing a flame-resistant polymer, particularly, since release at an ejection die orifice site becomes good upon shaping into a yarn shape, it becomes possible to suppress single fiber breaking or adhesion at the ejection die orifice site. Further, since a shaped product having a high physical strength at coagulation is obtained, damage of the shaped product is considerably reduced in a step of removing a dispersing medium remaining in the shaped product, that is, a stage of washing, a step speed can be improved. These effects are extremely remarkable upon shaping of the dispersion containing a flame-resistant polymer into a yarn shape and, particularly, the suppressing effect is great in a wet spinning method.

Further, the physical strength of a carbon fiber obtained by carbonizing a flame-resistant fiber obtained by wet-spinning the dispersion containing a flame-resistant polymer is also improved. Moreover, due to good release of the dispersion containing a flame-resistant polymer from a die orifice, a die orifice hole density can be increased, and space saving can be realized. Therefore, a production efficiency is improved.

DETAILED DESCRIPTION

In the dispersion containing a flame-resistant polymer in which a flame-resistant polymer is dispersed in an organic solvent, it is important that the in-water tensile strength per unit cross-sectional area of the flame-resistant polymer is 1.0 MPa or more and 6.5 MPa or less.

The in-water tensile strength per unit cross-sectional area is obtained by stretching the dispersion containing a flame-resistant polymer into a film, coagulating the film in water, cutting the coagulated film into a predetermined size, measuring the tensile strength of the film in water with a tensile testing machine, and by dividing its value by a cross-sectional area of a plane vertical to a tensile direction.

Details of a method of measuring the in-water tensile strength are as follows. That is, about 5 g of the dispersion containing a flame-resistant polymer retained at a temperature of 40° C. is cast on one side of a glass plate sufficiently dried at a temperature of 40° C., at a width of around 3 cm left and right from a central line, and is applied so as to be a constant thickness with a Baker type applicator. This is immediately mildly placed into a container of 20 cm×20 cm×10 cm filled with water conditioned at a temperature of 25° C. to 30° C., with a film plane upside. After allowing to stand for 1 minute, this is left as it is while water conditioned at a temperature of 25° C. to 30° C. flows in a container at a rate of 200 mL per minute so as not to directly touch the film. Subsequently, the film is cut into a size of 7 mm×15 mm with one blade of a razor to obtain a film cross-section. The film cross-section is slowly peeled from the glass plate, a thickness is measured in water at ten points, and an average value thereof is defined as a film thickness. This film cross-section having a film thickness of 100 μm to 150 μm is grasped in a tensile testing equipment so that a sample length site becomes 10 mm, and a tensile rate is measured in water at a tensile rate of 20 mm/min. The measurement number n is 25, and a value obtained by dividing an average of the resulting values by a cross-sectional area in a direction vertical to a tensile direction is defined as an in-water tensile strength. As the tensile testing equipment, Model 1125 manufactured by Instron is used.

This value of the in-water tensile strength per unit cross-sectional area is defined as an index of the coagulation hardness of the dispersion containing a flame-resistant polymer. When a flame-resistant polymer having a value of 1.0 MPa or more and 6.5 MPa or less is shaped, step stability of the shaped product is improved, particularly, single fiber breaking at a coagulating step in a coagulation bath upon shaping into a yarn shape, and a washing step of removing a dispersing medium is suppressed, and a flame-resistant fiber having an excellent quality is obtained. Further, when this flame-resistant fiber is carbonized by a normal method, as compared with a carbon fiber derived from a dispersion containing another flame-resistant polymer, a carbon fiber excellent in a physical strength can be obtained.

When the in-water tensile strength per unit cross-sectional area is 2.0 MPa or more and 6.5 MPa or less in the aforementioned range, fusion between fibers in a drying step is suppressed. Further, when the in-water tensile strength per unit cross-sectional area is 3.0 MPa or more and 6.5 MPa or less, by increasing a stretching rate at a spinning step and a drying step, it becomes remarkably easy to improve an orientation property of a fiber.

The flame-resistant polymer is a polymer having flame resistance, and the dispersion containing a flame-resistant polymer is a dispersion in which a flame-resistant polymer as a component is dispersed in an organic solvent. Herein, the dispersion is a viscous fluid, and a dispersion having fluidity upon shaping and molding may be used, not only having fluidity at a normal temperature, but also a solid and a gel having no fluidity at a certain temperature are included, including all having fluidity at around a processing temperature by heating and a shearing force.

As a back pressure at a die orifice during processing of the dispersion containing a flame-resistant polymer is lower, the dispersion can be more easily ejected, while when a certain viscosity is too low, an objective shaped form is obtained with difficulty in some cases. For this reason, a solution viscosity of the dispersion containing a flame-resistant polymer measured with a B-type viscometer at a processing temperature is preferably 1 Pa·s or more and 10 0 Pa·s or less, more preferably 2.5 Pa·s or more and 50 Pa·s or less.

In the dispersion containing a flame-resistant polymer, it is preferable that a content of the flame-resistant polymer is 5 parts by weight or more and 45 parts by weight or less based on the total amount of the dispersion containing a flame-resistant polymer. When the content of the flame-resistant polymer is lower than 5 parts by weight, the quality is deteriorated such as opening of a hole in a molded product at shaping of the dispersion containing a flame-resistant polymer in some cases, while when the content is higher than 45 parts by weight, fluidity of the dispersion containing a flame-resistant polymer is reduced, and shaping becomes difficult in some cases. The content of the flame-resistant polymer is more preferably 6 parts by weight or more and 30 parts by weight or less.

As an organic solvent, a polar organic solvent is preferably used. The polar organic solvent preferably has a relative permittivity as measured with an LCR meter under a normal temperature of preferably 2 or more, more preferably 10 or more. When the relative permittivity is such a value, it is possible to more stably disperse the flame-resistant polymer, dispersing medium extraction at coagulation process is easy, and handling is easy. When the relative permittivity is too small, extraction of a dispersing medium becomes difficult at use of an aqueous coagulation bath at a coagulation process. In addition, the relative permittivity has not particularly an upper limit, but when the upper limit is too great, it becomes difficult to stably disperse the flame-resistant polymer in some cases. Therefore, it is preferable to use a polar organic solvent having a relative permittivity of 80 or less.

Examples of the polar organic solvent preferably include dimethyl sulfoxide (DMSO), N-methyl-2-pyrrolidone (NMP), dimethylformamide (DMF), dimethylacetamido (DMAc), sulfolane, dimethylimidazolidione, ethylene glycol and diethylene glycol. As the polar organic solvent, DMSO, NMP, DMF and DMAc are more preferable and, among them, from a view point of a magnitude of solubility in a salt, DMSO and DMF are particularly preferably used. These polar organic solvents may be used alone, or two or more kinds may be used by mixing.

It is preferable that the content of the organic solvent is 45 parts by weight or more and 95 parts by weight or less based on the total amount of the dispersion containing a flame-resistant polymer. When the content of the organic solvent is less than 45 parts by weight, dispersing stability of the dispersion containing a flame-resistant polymer is remarkably reduced, and fluidity is lost in some cases, while when the content of the organic solvent is more than 95 parts by weight, a viscosity of the dispersion containing a flame-resistant polymer is reduced, and shaping itself becomes difficult in some cases.

Flame resistance has substantially the same meaning as that of a term "flameproof," and is used including the meaning of a term of "flame retardant." Specifically, flame resistance is a generic name indicating a nature that firing continues with difficulty, that is, a material is burnt with difficulty. As the mean for specifically assessing flame-resistance performance, for example, a method of testing flame proofness of a thin material (45° Merker Burner method) is described in JIS Z 2150 (1966). A sample to be assessed (board, plate, sheet, film, thick fabric and the like having a thickness of less than 5 mm) is heated with a burner for a specific time, and determination can be performed by assessing a flame remaining time and a carbonization length after firing. As a flame remaining time is shorter, or as a carbonization length is shorter, it is determined that flame resistance (flameproof) performance is excellent. In the case of a fiber product, a method of testing burning of a fiber is described in JIS L 1091 (1977). After a test by this method, flame resistance performance can be determined similarly by measuring a carbonization area and a flame remaining time.

There are various shapes/forms of a flame-resistant polymer and a flame-resistant molded article, and a degree of flame resistance performance is over a wide range from very high flame resistance of no firing to a some extent of continuous burning after firing. A subject is one which is recognized at not less than a level determined for flame resistance performance by a specific assessing method shown in Examples described later. Specifically, excellent or better in flame resistance performance in a method of assessing flame resistance described later is preferable. Particularly, at a stage of a flame-resistant polymer, a shape/form of a polymer varies depending on isolation condition, and a considerable scatter is easily included as a nature of flame resistance and, therefore, a method of assessment after molding into a constant shape is adopted.

A flame-resistant molded article such as a flame-resistant fiber obtained by molding a flame-resistant polymer can be also measured similarly by the specific means of assessing flame resistance shown in Examples described later.

A flame-resistant polymer, a precursor of which is an acrylonitrile polymer, has a structure which is chemically similar to that of a flame-resistant polymer obtained by heating a fibrous acrylonitrile polymer in the air. Although a structure of both flame-resistant polymers has not been completely clarified, it is thought that those polymers have naphthyridine ring, acrydone ring and hydrogenated naphthyridine ring structures generated by a cyclization reaction or an oxidization reaction of a nitrile group, as described in references which analyze an acrylonitrile flame-resistant fiber (Journal of Polymer Science Part A: Polymer Chemistry) (J. Polym. Sci. Part A: Polym. Chem.), 1986, vol. 24, p. 3101. A flame-resistant polymer dispersed in an organic solvent has no disorder even when an unreacted nitrile group remains, as far as flame resistance is not deteriorated, and has no disorder even when a minor amount of a crosslinking bond is generated between molecules, solubility is not deteriorated. From such a viewpoint, the acrylonitrile polymer which is a precursor of the flame-resistant polymer may be straight, or branched. Alternatively, the polymer may contain, in a skeleton thereof, other copolymerization component such as acrylate or methacrylate and vinyl compounds randomly or as a block.

The molecular weight of the flame-resistant polymer may be a molecular weight having a viscosity depending on a molding method, and it is preferable that the mass average molecular weight (Mw) of a precursor polymer as measured by gel permeation chromatography (GPC) is 1000 to 1000000. When the mass average molecular weight of the precursor polymer is lower than 1000000, a necessary time for flame-resisting can be shortened, but since intermolecular interaction such as a hydrogen bond between heat-resistant polymers becomes weak, it becomes possible to attain a sufficient strength in a shaped molded article. On the other hand, when the mass molecular weight of the precursor polymer exceeds 1000000, since a time necessary for thermostabilization becomes longer, the production cost is increased, and molecular interaction due to a hydrophobic bond between flame-resistant polymers becomes too strong, the polymer is gelled at cooling, and it becomes difficult to obtain fluidity of the dispersion containing a flame-resistant polymer at a shaping temperature, in some cases. The mass average molecular weight of the precursor polymer is more preferably 10000 to 50000, further preferably 20000 to 300000.

The chemical structure of the flame-resistant polymer is preferably such that a solution thereof is measured with a nuclear magnetic resonance apparatus (NMR) for 13-C, and the structure has a signal in a range of 150 to 200 ppm, and is preferable that the structure has a maximum absorption peak at around 1600 $cm^{-1}$ by infrared spectrometry (IR). When the polymer has a peak in a range by both measuring methods, it can be said to be a flame-resistant polymer having particularly high heat-resistance.

A flame-resistant polymer may be obtained by heat-treating either of a solid single material of an acrylonitrile polymer as a precursor, or a polymer in the state where it is dispersed in an organic solvent. Since a solid of the flame-resistant polymer has low affinity for a polar solvent, and is dispersed with difficulty in some cases, the latter procedure is preferable.

When a dispersion of an acrylonitrile polymer as a precursor is heat-treated to perform flame-resisting, condition of a temperature, a time and an apparatus, and a procedure are not particularly limited as far as flame-resisting progresses. A heating method is not particularly limited, any industrially sold heating apparatus, a representative of which is a jacket heating medium circulation, a mantle heater, an oil bath or an immersion heater may be used. However, when flame-resisting is performed at a high temperature, since a risk of bumping of a solvent, and ignition or inflammation is increased, it is preferable to perform flame-resisting at a boiling point of a solvent used or lower. In addition, regarding a reaction time, since a flame-resisting reaction is an exothermic reaction, a reaction in a short time makes heat removal difficult, leading to a runaway reaction in some cases and, therefore, it is preferable to adjust the reaction time to 30 minutes or longer. On the other hand, when flame-resisting is performed over a long period of time, a production amount per unit time is reduced, and therefore this is non-productive, a reaction time is preferably within 24 hours, more preferably 1 hour or longer and 12 hours or shorter.

When flame-resisting is performed by heat-treating a dispersion of an acrylonitrile polymer as a precursor, a reaction can progress at a low temperature of 160° C. or lower by using an oxidizing agent and a cyclizing agent, being a preferable aspect.

The oxidizing agent is a compound having an action of extracting a hydrogen atom from a precursor polymer by a reaction, or an action of donating an oxygen atom, and specific examples of the oxidizing agent include a nitro-based compound and a quinone-based compound from a view point of safety and reactivity.

As the nitro-based compound, from heat stability at a reaction, a mononitro compound having an aromatic ring is more preferable, examples include nitrobenzene, o-, m-, and p-nitrotoluene, o-, m-, and p-nitrophenol, nitroxylene and nitronaphthalene, and nitrobenzene and o-, m-, and p-nitrotoluene are particularly preferably used. Examples of the quinone-based compound include 1,4-benzoquinone, chloranil, bromanil, chloro-1,4-benzoquinone, dichloro-1,4-benzoquinone, bromo-1,4-benzoquinone, dibromo-1,4-benzoquinone, tetrafluoro-1,4-benzoquinone, 2,3-dichloro-5,6-dicyano-1,4-benzoquinone, orthobenzoquinone, orthochloranil and orthobromanil, and 1,4-benzoquinone, chloranil, dichloro-1,4-benzoquinone, and 2,3-dichloro-5,6-dicyano-1,4-benzoquinone are particularly preferably used.

The addition amount of these oxidizing agents is not particularly limited, but is preferably 0.01 to 20.0 parts by weight, more preferably 0.1 to 10.0 parts by weight based on 10.0 parts by weight of the precursor polymer. These oxidizing agents may be used alone, or may be used by mixing two or more kinds.

The cyclizing agent is a compound which derives a non-cyclic skeletal site into a cyclic structure by generation of a bond, and specific examples of the cyclizing agent include organic nucleophiles such as amine-based compounds, guanidine-based compounds, alcohol-based compounds, aminoalcohol-based compounds, carboxylic acid-based compounds, thiol-based compounds, and amidine-based compounds, metal alkoxide compounds, metal amide compounds, metal imide compounds, metal hydrides, metal hydroxides and metal carbonates and carboxylic acid metal salts. From a viewpoint of a magnitude of a cyclization efficiency and stability of a reagent, amine-based compounds, guanidine compounds, amino alcohol compounds, metal alkoxide compounds and metal imide compounds are preferably used. Among them, from a viewpoint of dispersing property of the flame-resistant polymer, amino alcohol-based compounds are particularly preferably used.

As the amine-based compounds, any compound may be used as far as it has an amine skeleton, and examples include ammonia, methylamine, ethylamine, propylamine, butylamine, allylamine, pentylamine, octylamine, dodecylamine, aniline, benzylamine, toluidine, ethylene-diamine, propanediamine, cyclohexanediamine, decamethylene diamine, 3,5-pyridinediamine, N,N-dimethylethylenediamine, N,N-diethylethylenediamine, 3,5-dimethylbenzene-2,4-diamine, and 1,12-dodecanediamine.

As the guanidine-based compounds, any compound may be used as far as it has a guanidine structure, and examples include guanidine carbonate, guanidine thiocyanate, guanidine acetate, guanidine phosphate, guanidine hydrochloride, guanidine nitrate, guanidine sulfate, methylguanidine, ethylguanidine, dimethylguanidine, aminoguanidine, phenylguanidine, naphthylguanidine, nitroguanidine, nitrosoguanidine, acetylguanidine, cyanoguanidine, and guanyl-urea, and guanidine carbonate, guanidine acetate and guanidine phosphate are particularly preferably used.

Examples of the amino alcohol-based compounds include monoethanolamine and diethanolamine, examples of the propanolamine metal alkoxide compounds include potassium tert-butoxide, sodium tert-butoxide, potassium methoxide, sodium methoxide, potassium ethoxide, sodium ethoxide, potassium isopropoxide, sodium isopropoxide, potassium isobutoxide, sodium isobutoxide, and sodium phenoxide, and potassium tert-butoxide and sodium tert-butoxide are particularly preferably used.

Examples of the metal imide compounds include potassium phthalimide and sodium phthalimide and, among them, potassium phthalimide is preferably used.

The addition amount of these cyclizing agents is not particularly limited, but is preferably 0.01 to 50.0 parts by weight, more preferably 0.1 to 20.0 parts by weight, further preferably 0.3 to 10.0 parts by weight based on 10.0 parts by weight of the precursor polymer.

To obtain the flame-resistant polymer having an in-water tensile strength per unit cross-sectional area of 1.0 MPa or more and 6.5 MPa or less, it is preferable to add an acid when a dispersion of an acrylonitrile polymer is heat-treated. The acid may be added before heat treatment, or during heat treatment.

The acid as used herein may be defined as either of an acid defined as an acid by donating and accepting a proton, or an acid defined as an acid by donating and accepting an electron. Alternatively, two or more kinds among them may be used by mixing.

Specifically, examples of the acid defined as an acid by donating and accepting a proton include preferably inorganic acids such as hydrochloric acid, nitric acid, sulfuric acid, phosphoric acid and hydrobromic acid, carboxylic acids such as formic acid, acetic acid, propionic acid, butyric acid, isobutyric acid, valeric acid, caproic acid, enanthic acid, carpylic acid, pelargonic acid, capric acid, lauric acid, myristic acid, palmitic acid, margaric acid, stearic acid, oleic acid, linoleic acid, linolenic acid, arachidonic acid, benzoic acid, methylbenzoic acid, phthalic acid, fumaric anhydride, isophthalic acid, terephthalic acid, salicylic acid, gallic acid, pyruvic acid, lactic acid, malic acid, citric acid, oxalic acid, malonic acid, succinic acid, fumaric acid, maleic acid, aconitic acid, glutaric acid, adipic acid, feruloyl, hydroxybenzoic acid, homo-salicylic acid, pyrochatechuic acid, resorcylic acid, gentisic acid, vanillic acid, isovanillic acid, orsenillic acid, asaronic acid, mandelic acid, phthalonic acid, benzilic acid, phloretic acid, tropic acid and coumaric acid, and sulfonic acids such as methanesulfonic acid, trifluoromethane-sulfonic acid, ethanesulfonic acid, taurine, propanesulfonic acid, hydroxypropanesulfonic acid, benzenesulfonic acid, tosylic acid, camphorsulfonic acid, orthanilic acid, metanilic acid, sulfanilic acid, naphthalenesulfonic acid, and aminonaphthalenesulfonic acid.

A carboxylic acid and a sulfonic acid referred herein are a generic name of a compound having a carboxyl group or a sulfonic acid group, respectively, and may have other functional group such as a hydroxy group and an amino group in a molecule.

In addition, examples of the acid defined by donating and accepting an electron include Lewis acids such as aluminum chloride, zinc chloride, iron chloride, silver triflate, iron cyanide and copper chloride.

Among them, from a viewpoint of availability in a large amount and at a low cost, and inclusion of no metal, it is preferable to use a carboxylic acid or a sulfonic acid which has little environmental load, and excellent in a handling property at a large scale. Among carboxylic acids, a carboxylic acid which has high solubility in a polar solvent used in a reaction, has a high boiling point and can set a reaction temperature to be high, specifically, a monocarboxylic acid such as benzoic acid, hydroxybenzoic acid, methylbenzoic acid, and aminobenzoic acid, and a dicarboxylic acid such as phthalic acid, isophthalic acid and terephthalic acid are preferably used.

Among them, phthalic acid and isophthalic acid and terephthalic acid which are a dicarboxylic acid are preferable, and yarn breaking at a spinning step is further dramatically reduced, and step stability is improved. This is considered as follows: due to the presence of two carboxyl groups in one molecule of an acid, crosslinking occurs between flame-resistant polymers, and interaction due to entanglement between the flame-resistant polymers is increased.

Regarding a sulfonic acid, since a boiling point of methanesulfonic acid having a small molecular weight is 167° C., a reaction temperature can be set high even when any compound is selected, therefore, any is preferably used as far as it is a compound having a sulfonic acid group. However, since aminosulfonic acid which is a sulfonic acid having an amino group in a molecule can improve coagulation hardness of the flame-resistant polymer without inhibiting nucleophilic ability of a cyclizing agent, it is further preferable. That is, when aminosulfonic acid is used, there is also the effect of reducing an addition amount of a cyclizing agent, and it is possible to save a raw material and a waste. Among them, because of industrially easy availability, taurine and sulfanilic acid can be particularly preferably exemplified.

Like the acid, an acid anhydride and an acid chloride can be also preferably used. An acid anhydride mentioned herein refers to a compound in a form that two acyl groups share an oxygen atom, by losing one molecule of water from two carboxyl groups of a carboxylic acid defined in the Dictionary of Chemistry (Tokyo Kagaku Dojin). Specific examples of the acid anhydride preferably include adipic anhydride, succinic anhydride, butyric anhydride, citric anhydride, tartaric anhydride, hexanoic anhydride, benzoic anhydride and phthalic anhydride.

In addition, the acid chloride refers to a compound in which a hydroxyl group contained in a carboxyl group of carboxylic acid defined in the Dictionary of Chemistry (Tokyo Kagaku Dojin) is substituted with chlorine. Specific examples of the acid chloride preferably include acetyl chloride, propionyl chloride, pivaloyl chloride, butanoyl chloride, benzoyl chloride, anisole chloride, naphthoyl chloride and phthaloyl dichloride.

When an amount of an acid, an acid anhydride and an acid chloride to be added to the dispersion containing a precursor polymer which is an acrylonitrile polymer is small, the clear effect is seen little. On the other hand, when a large amount of an acid or the like is added, progression of a flame-resisting reaction becomes slow, and a precursor polymer is precipitated in some cases. Therefore, the total addition amount of the acid, the acid anhydride and the acid chloride is in a range of preferably 0.05 part by weight to 7.0 parts by weight, more preferably 0.1 part by weight to 5.0 parts by weight based on 10.0 parts by weight of the precursor polymer.

Specifically, for example, the addition amount of an acid when an acrylonitrile polymer is used as a precursor polymer, and a dicarboxylic acid is used as an acid is preferably in a range of 0.05 part by weight to 5.0 parts by weight based on 10.0 parts by weight of the acrylonitrile polymer. When the addition amount of the acid is more than 50 parts by weight, dispersing stability of the dispersion containing a flame-resistant polymer is reduced, and fluidity is easily lost in some cases. The addition amount of the acid is further preferably in a range of 0.1 part by weight to 2.0 parts by weight.

A method of removing a dispersing medium from a dispersion containing a shaped flame-resistant polymer is not particularly limited, but examples include a method of evaporating a dispersing medium from a dispersion containing a shaped flame-resistant polymer by heating or reduction in a pressure, a method of immersing a dispersion containing a shaped flame-resistant polymer in a coagulation solution, and extracting a dispersing medium into the coagulation solution, and the like. A method of extracting a dispersing medium into a coagulation solution which is simple in control, and has high productivity of a process is preferable.

As the coagulation solution, a poor solvent of the flame-resistant polymer, which is compatible of the dispersing medium is preferably used. It is preferable to use an aqueous coagulation solution as the coagulation solution and, to make recovery of an extracted dispersing medium easy, it is preferable to use a coagulation solution of a mixture system of water, and a solvent which is the same kind as that of a dispersing medium used in the dispersion containing a flame-resistant polymer. A solvent other than the dispersing medium used in the dispersion containing a flame-resistant polymer may be mixed into these coagulation solutions and, from a viewpoint of solvent recovery, it is preferable to constitute a coagulation solution only of water, and a solvent which is the same kind as that of the dispersing medium used in the dispersion containing a flame-resistant polymer. Further, a mixing ratio of water and a solvent in the coagulation solution is preferably 1:9 to 9:1, more preferably 2:8 to 8:2, further preferably 3:7 to 7:3. Adopting of such a mixing ratio is also allowed to control a coagulation rate, and properties depending on utility can be also controlled by the coagulation solution. In addition, the coagulation solution may contain an inorganic salt, a pH adjusting agent, a step treating agent, and a reaction promoting agent of a dispersion as a compound which makes extraction of a dispersing medium easy.

As a method of shaping the dispersion containing a flame-resistant polymer into a fiber, methods such as a wet spinning method, a dry wet spinning method, a dry spinning method, a flash spinning method, an electrospinning method, a spunbond method, a melt blow method and a centrifugal force spinning method can be adopted. Among them, a wet spinning method and a dry wet spinning method have high productivity, and are preferably applied. Particularly, in the wet spinning method, since a dispersing medium begins to be removed immediately after shaping of the dispersion containing a flame-resistant polymer, productivity is high, and even when a fiber strength immediately after shaping is low, a fiber can be run at a low rate, and handling is easy. The wet spinning method mentioned herein is a method of introducing the dispersion containing a flame-resistant polymer into a die orifice having a plurality of holes after weighing/filtration, ejecting the dispersion through a die orifice hole by a pressure applied to the dispersion containing a flame-resistant polymer to shape it, and immediately coagulating the shaped dispersion with a coagulation solution. In addition, the dry wet spinning is a method of ejecting the dispersion containing a flame-resistant polymer through the die orifice hole to shape it, running the ejected dispersion in an air phase, and coagulating it with a coagulation solution.

As a material of the die orifice used herein, SUS, gold and platinum can be conveniently used. In addition, it is a preferable aspect from a viewpoint of reduction in a scatter of a single fiber cross-sectional area in an aggregate of the resulting flame-resistant fiber that before the dispersion containing a flame-resistant polymer is flown into the die orifice hole, the dispersion containing a flame-resistant polymer is filtered or dispersed using a sintered filter of an inorganic fiber, or a woven fabric, a knitted fabric and a non-woven fabric consisting of a synthetic fiber such as a polyester fiber and a polyamide fiber as a filter.

A die orifice hole diameter in a range of preferably 0.01 to 0.5 mm, and a hole length in an arbitrary range of preferably 0.01 to 1 mm can be used. In addition, any of a die orifice hole number in a range of preferably 10 to 1000000 can be used. As hole arrangement, any alignment such as zigzag alignment can be used, and the dispersion may be pre-divided so as to easily perform fiber separation.

It is preferable that a coagulation step, when wet spinning is performed, uses a combination of two or more coagulation baths. A first bath forms a flame-resistant polymer into a yarn shape, a second or after bath removes reagents and a dispersing medium remaining in a coagulated yarn, that is, washing, thereby, a coagulation bath as a whole can be compact.

A temperature of the coagulation solution can be an arbitrary temperature of a coagulation point or higher and a boiling point or lower of a coagulation solution in the first bath, and can be conveniently adjusted in conformity with a coagulation property and step passability of the flame-resistant polymer.

To make a structure of a coagulated yarn compact, it is preferable that a temperature of the coagulation solution is in a range of 20° C. or higher and 40° C. or lower. In addition, in the second or after bath having a main object of washing, an arbitrary temperature of a coagulation point or higher and a boiling point or lower of the coagulation solution is possible, and when water is used in the coagulation solution, it is preferable that a temperature of the coagulation solution is 60° C. or higher and 85° C. or lower. By adopting such a temperature of the coagulation solution, reagents and a dispersing medium remaining in the yarn formed in the first bath are effectively extracted. In addition, it is preferable that the concentration of a poor solvent in the coagulation solution is increased with passage through a coagulation step.

It is preferable that a lubricant described later is imparted to a fiber yarn in the water-swollen state after water washing and stretching. As a method of imparting a lubricant, in view of that the lubricant can be uniformly imparted into the interior of a fiber yarn, a method may be arbitrarily selected and used and, specifically, means such as immersion of a fiber yarn into a lubricant bath, and spraying and addition dropwise to a running fiber yarn are adopted. It is preferable that the concentration of the lubricant upon impartation herein is in a range of 0.01 to 20% by weight. Herein, the lubricant consists of, for example, a main lubricant component such as silicone and a diluent component for diluting it, and a lubricant concentration is a ratio of a content of a main lubricant component relative to a total lubricant.

The adhesion amount of a lubricant component is such that a ratio of a net matter relative to a dry weight of a fiber yarn is in a range of preferably 0.1 to 5% by weight, more preferably 0.3 to 3% by weight, further preferably 0.5 to 2% by weight. When the adhesion amount of the lubricant component is too small, fusion between single yarns occurs and, when the adhesion amount is too great, a burning scatter at firing reduces a tensile strength of the resulting carbon fiber, in some cases.

As a method of drying a fiber yarn, a method of directly contacting a fiber yarn with a plurality of dried and heated rollers, a method of supplying hot air or water steam to a fiber yarn, a method of irradiating a fiber yarn with infrared-ray or electromagnetic wave at a high frequency, and a method of bringing out the pressure-reduced state can be conveniently selected and combined. Normally, when the hot air is supplied, this can be performed by supplying the hot air in parallel with, or orthogonal with a running direction of a fiber yarn. As radiation heating-system infrared-ray, far infrared-ray, mid-infrared-ray and near infrared-ray can be used, and irradiation with a microwave can be also selected. A drying temperature can be arbitrarily in a range of around 50 to 450° C. and, generally, in the case of a low temperature, a long time is required and, in the case of a high temperature, the yarn can be dried in a short time.

A molded material of a fiber or the like obtained by shaping and molding the dispersion containing a flame-resistant polymer contains many voids in some cases. In many cases, it is desirable that a mechanical strength of the molded material is further increased. As the means to improve this mechanical strength, it is preferable that the means is via a sintering/firing step of closing voids by heat-treating the molded article obtained as described above.

In the step, the condition such as a temperature profile and a step passage rate depends on a material, and the molded article is heat-treated preferably at a temperature which is lower than a softening temperature of the molded article by 50° C., more preferably at a softening point or higher. At a treating temperature lower than (softening point temperature −50° C.), it is difficult to close voids contained in the molded article. In addition, there is particularly no upper limit of a temperature, but when the molded article is softened, and a shape is retained with difficulty, it is preferable to rise a treating temperature at a few stages, or continuously rise a treating temperature.

In addition, when a softening point thereof is lowered with a plasticizer, sintering/firing can be performed while a thermal degradation reaction is suppressed. A component of the plasticizer may be contained in the dispersion containing a flame-resistant polymer in advance, and from a viewpoint of recovery of a dispersing medium containing a flame-resistant polymer, it is preferable that the component is imparted between a coagulation step and a sintering/firing step. The plasticizer is not particularly limited as far as it lowers a softening point, and from a viewpoint of uniform impartation to the molded article, and dispersing into a dispersion, it is preferable that the plasticizer is a liquid. Inter alia, it is a preferable aspect to use water which is friendly to the environment and has high safety, and it is a further preferable aspect to use water containing a surfactant, to improve an adhering property to a yarn.

In heat treatment when the molded article of a fiber or the like is converted into a sintered/fired body, a chemical structure of the molded article may be changed. For example, in the case where the flame-resistant polymer is a condensed-based polymer compound, a molecular weight thereof is increased by solid phase polymerization under the vacuum atmosphere and, in the case where the polymer is a flame-resistant polymer having an acridone skeleton or a pyrimidine skeleton, it changes into a graphite structure in some cases. These changes are made to occur after voids contained in the molded article are once decreased by heat treatment. By doing this, a sintered/fired body having little voids, and excellent in mechanical properties can be obtained.

Heat treatment when the molded article is converted into a sintered/fired article may be not accompanied with change in a chemical structure of the molded article. For example, in the case of silica and titania obtained by a sol-gel transition method, by heat treatment at a suitable temperature, not only voids between particles are substantially closed, but also a suitable sintered/fired article is obtained.

In addition, in a heat treating step upon firing/sintering, deformation such as stretching and compression may be imparted to the molded article. By these deformations, a form of the resulting fired/sintered article becomes more preferable, and mechanical properties thereof and other properties can be improved.

A shaped and molded flame-resistant fiber may exhibit a form of a fiber aggregate such as a multifilament and the like. A carbon fiber aggregate can be obtained by heat-treating, under the inert atmosphere, so-called carbonization-treating a flame-resistant fiber aggregate. The carbon fiber aggregate can be obtained by heat-treating the flame-resistant fiber aggregate at a highest temperature in a range of suitably 300° C. or higher and lower than 2000° C. in the inert atmosphere. More preferably, as a lower part of a highest temperature, 800° C. or higher, 1000° C. or higher, and 200° C. or higher are preferable in this order and, as a higher part of a highest temperature, 1800° C. or lower can be also used. Alternatively, the resulting carbon fiber aggregate is further heat-treated at a temperature of preferably 2000 to 3000° C. in the inert atmosphere, thereby, a carbon fiber aggregate having a developed graphite structure can be also obtained.

As a strength of the resulting carbon fiber aggregate, 100 MPa or more, 200 MPa or more, and 300 MPa or more are preferable in this order, and as a greater part of a strength, 10000 MPa or less, 8000 MPa or less, and 6000 MPa or less are suitable in this order. When the strength is too low, the aggregate cannot be used as a reinforcing fiber in some cases. A higher strength is more preferable, but when the strength is 1000 MPa, this is sufficient in many cases.

In addition, the fiber diameter of a single fiber constituting a carbon fiber aggregate is preferably 1 nm to $7\times10^4$ nm, more preferably 10 to $5\times10^4$ nm, further preferably 50 to $10^4$ nm. When the fiber diameter is less than 1 nm, a fiber is easily broken in some cases and, when the fiber diameter is more than $7\times10^4$ nm, there is a tendency that a defect is easily generated conversely.

In addition, the specific gravity of the carbon fiber aggregate obtained is preferably 1.3 to 2.4, more preferably 1.6 to 2.1, further preferably 1.6 to 1.75. When the specific gravity less than 1.3, a fiber is easily broken in some cases and, when the specific gravity is more than 2.4, there is a tendency that a defect is easily generated conversely. The specific gravity can be measured by a liquid immersion method or a floating and sinking method. Herein, the carbon fiber single fiber may contain a hollow part like a hollow fiber. In this case, the hollow part may be continuous, or discontinuous.

The resulting carbon fiber aggregate can be electrolysis-treated to modify a surface thereof. As an electrolysis solution used in electrolysis treatment, acidic solutions such as sulfuric acid, nitric acid and hydrochloric acid, or alkalis such as sodium hydroxide, potassium hydroxide, and tetraethylammonium hydroxide, or salts thereof can be used as an aqueous solution. Herein, the amount of electricity required in electrolysis treatment can be conveniently selected depending on a carbon fiber to be applied.

By electrolysis treatment, adherability between a carbon fiber material and a matrix in the obtained composite material can be made to be suitable, and a problem of brittle destruction of a composite material due to too strong adhesion, and reduction in a tensile strength in a fiber length direction, and a problem that a tensile strength in a fiber length direction is high, but adherability with a resin is inferior, and a strength property in a transverse direction of a fiber is not manifested are solved, and the balanced strength property becomes to be manifested in the resulting composite material.

Thereafter, to impart convergence to the resulting carbon fiber aggregate, a sizing agent can be also imparted. As the sizing agent, a sizing agent having good compatibility with a resin can be arbitrarily selected depending on a kind of resin to be used.

Specifically, when the carbon fiber aggregate is obtained from the flame-resistant polymer via a flame-resistant fiber aggregate, spinning of a flame-resistant polymer containing solution to obtain a flame-resistant fiber aggregate, and up to carbonization treatment are continuously performed without a winding step, surface treatment and sizing agent imparting step are further included, thus, the carbon fiber aggregate can be produced by one continuous process.

From a viewpoint of the lower cost, a process for continuously producing the carbon fiber aggregate by one process from the flame-resistant polymer to the carbon fiber aggregate can be adopted.

EXAMPLES

Our dispersions, fibers and methods will be specifically explained by way of Examples. Each physical property value and properties in each Example were measured by the following methods.

Tensile Strength Per Unit Cross-Sectional Area in Water

About 5 g of a flame-resistant polymer dispersion retained at a temperature of 40° C. was cast on one side of a glass plate which had been sufficiently dried at a temperature of 40° C., at a width of around 3 cm left and right from a central line, and was applied with a Baker type applicator so that a thickness became constant. This was immediately mildly placed into a container of 20 cm×20 cm×10 cm filled with water conditioned at a temperature of 25° C. to 30° C., with a film plane upside. After allowing to stand for 1 minute, this was left as it is while water conditioned at a temperature of 25° C. to 30° C. flowed in a container at a rate of 200 mL per minute so as not to directly touch the film. Subsequently, the film was cut into a size of 7 mm×15 mm with one blade of a razor to obtain a film cross-section. The film cross-section was slowly peeled from a glass plate, a thickness was measured in water at ten points, and an average thereof was defined as a film thickness. This film cross-section having a film thickness of 100 μm to 150 μm was grasped in a tensile testing equipment so that a sample length site became 10 mm, and a tensile rate was measured in water at a tensile rate of 20 mm/min. The measurement number n was 25, and a value obtained by dividing an average of the resulting values with a cross-sectional area in a direction vertical to a tensile direction was defined as an in-water tensile strength. As the tensile testing equipment, Model 1125 manufactured by Instron was used.

Assessment of Yarn Breaking at Washing-I

A flame-resistant polymer dispersion conditioned at a temperature of 30° C. was passed through a sintered filter, and a fiber yarn was wound at a rate of 1.3 m/min while the dispersion was ejected at a rate of 10 cc per minute in a coagulation bath consisting of 55 parts by weight of dimethyl sulfoxide and 45 parts by weight of water conditioned at a temperature of 30° C. through a die orifice having 1000 holes of a hole diameter of 0.05 mm, the yarn was immediately wound in a water bath conditioned at a temperature of 70° C. at a rate of 1.7 m/min for 3 hours without drying, single fibers floating or settling in the water bath were filtered and collected and, when the mass after dried at 120° C. for 2 hours was 0 mg or more and less than 15 mg, this was defined as excellent (⊚) and, when the mass was 15 mg or more and less than 50 mg, this was defined as good (○) and, when the mass was 50 mg or more, this was defined as worse (x), thus, assessment was performed.

Assessment of Yarn Breaking at Washing-II

A flame-resistant polymer dispersion conditioned at a temperature of 30° C. was passed through a sintered filter, and a fiber yarn was wound at a rate of 3.0 m/min while the dispersion was ejected at a rate of 10 cc per minute into a coagulation bath consisting of 55 parts by weight of dimethyl sulfoxide and 45 parts by weight of water conditioned at a temperature of 30° C. through a die orifice having 1000 holes of a hole diameter of 0.05 mm, the yarn was immediately wound in a water bath conditioned at a temperature of 70° C. at a rate of 6.0 m/min for 3 hours without drying, single fibers floating or settling in the water bath were filtered and collected and, when the mass after dried at 120° C. for 2 hours was 0 mg or more and less than 15 mg, this was defined as excellent (⊚) and, when the mass was 15 mg or more and less than 50 mg, this was defined as good (○) and, when the mass was 50 mg or more, this was defined as worse (x), thus, assessment was performed.

Isolation of Flame-Resistant Polymer and Measurement of Concentration

A dispersion containing a flame-resistant polymer was weighed, about 4 g was placed into 500 ml of water, and this was boiled. A solid was taken out once, placed in 500 ml of water again, and this was boiled. A remaining solid matter was placed on an aluminum pan, and dried in an oven at a temperature of 120° C. for 1 hour, and a flame-resistant polymer was isolated. An isolated solid matter was weighed, a ratio relative to a weight of the original dispersion containing a flame-resistant polymer was calculated to obtain a concentration.

NMR Measurement of Flame-Resistant Polymer

An NMR spectrum of a flame-resistant polymer was measured at room temperature at a measurement nuclear frequency of 67.9 MHz, and a spectrum width of 15015 kHz using a spectrum of the known solvent as an internal standard. As an apparatus, GX-270 manufactured by JEOL Ltd. was used.

IR (Infrared Spectrophotometer) Measurement

After a heat-resistant polymer was subjected to removal of a solvent in hot water at a high temperature, IR was measured using FT-IR measuring instrument (manufactured by Shimadzu) using a tablet obtained by grinding and mixing 2 mg of a lyophilized material and 300 mg of KBr for infrared absorption with a mortal, and processing the mixture with tablet molding equipment.

Measurement of Specific Gravity of Fiber

An automatic specific gravity measuring apparatus by a liquid immersion method, equipped with an electron balance was made by ourselves, and measurement was performed according to JIS Z 8807 (1976). As a liquid, ethanol was used, and a sample was placed therein, followed by measurement. A sample was sufficiently wetted in another bath using ethanol before placement in advance, and a defoaming procedure was performed.

Method of Assessing Flame-Resistance of Fiber

A bundle-like fiber aggregate consisting of 1500 single fibers was heated with a flame of a Merker Burner having a height of 160 mm, and an internal diameter of 20 mm for 10 seconds at a sample length of 30 cm according to JIS L 1091 (1977), a flame remaining time and a carbonization length were obtained, and flame resistance was assessed from those values using the following criteria:

[Flame resistance excellent]: A flame remaining time is 10 seconds or shorter, and a carbonization length is 5 cm or less.

[Flame resistance good]: A flame remaining time is 10 seconds or shorter, and a carbonization length is 10 cm or less.

[Presence of flame resistance]: A flame remaining time is 10 seconds or shorter, and a carbonization length is 15 cm or less.

[Worse]: A remaining time is more than 10 seconds, or a carbonization length is more than 15 cm.

The measurement number n is 5, and the state in which the corresponding number is most is defined as flame resistance of a sample. When the assessment is not determined, n=5 assessment is further added, and measurement is repeated until assessment is determined.

Tensile Strength, Tensile Elastic Modulus and Tensile Elongation of Single Fiber In any case, a tensile test is performed according to JIS L1013 (1999). A single fiber having a length of 25 mm was adhered to a paper piece having a smooth and lustrous surface one by one at every 5 mm width, in the state where both ends were mildly stretched with an adhesive so that a sample length became about 20 mm. A sample was attached to a gripper of a fiber tensile tester, the paper piece was cut near an upper gripper, and the sample was measured at a sample length of 20 mm, and a tensile rate of 20 mm/min. The measurement number n was 50, and an average was defined as a tensile strength, a tensile elastic modulus and tensile elongation, respectively. In Examples, as a fiber tensile tester, Model 1125 manufactured by Instron was used.

Example 1

A dispersion in which 10.0 parts by weight of an acrylonitrile homopolymer as a precursor polymer, 3.5 parts by weight of monoethanolamine as a cyclizing agent, 8.0 parts by weight of orthonitrotoluene as an oxidizing agent, and 3.0 parts by weight of benzoic acid as an acid were dispersed in 75.5 parts by weight of dimethyl sulfoxide as an organic solvent was stirred at a temperature of 150° C. for 8 hours, and cooled to a temperature of 30° C. to obtain a dispersion in which a flame-resistant polymer was dispersed in dimethyl sulfoxide. The average thickness of a film made by the method of "Tensile strength per unit cross-sectional area in water," of the resulting dispersion containing a flame-resistant polymer was 141 μm, and the tensile strength per cross-sectional area was 3.15 MPa. In addition, the concentration of the flame-resistant polymer of the resulting dispersion containing a flame-resistant polymer was 12.1% by weight and, when the flame-resistant polymer isolated from the dispersion containing a flame-resistant polymer was analyzed by 13C-NMR, there was clearly a peak derived from the flame-resistant polymer which was not confirmed in polyacrylonitrile as a precursor polymer, an organic solvent, or a modifier, at 160 to 180 ppm. In addition, when analyzed by IR, there was a clear peak at 1600 cm$^{-1}$.

When this dispersion containing a flame-resistant polymer was assessed by spinning by the method of "Assessment of yarn breaking at washing-I," there was no (0 mg) single fiber floating or settling in a water bath, and assessment was excellent (⊚). In addition, single fiber breaking or clogging at a die orifice site was not entirely present. Then, when the assessment was performed by spinning by the method of "Assessment of yarn breaking at washing-II," there was 10 mg of a short fiber floating or settling in a water bath, and assessment was excellent (⊚). Thereafter, an aminosilicone lubricant was imparted, and the yarn was dried at a temperature of 220° C. for 3 minutes in a hot air circulating furnace. The specific gravity of the dried yarn was 1.30, and the elongation of the dried yarn was 3.0%. Further, the dried yarn was stretched 1.5-fold and, at the same time, heat-treated at a temperature of 300° C. for 3 minutes in a hot air circulating furnace to obtain a flame-resistant fiber bundle. The fineness of a single yarn in the resulting flame-resistant fiber bundle was 1.0 dtex, the strength was 2.3 g/dtex, and the elongation was 18%. When the flame resistance was assessed, the yarn became red without burning, and it was seen that the yarn has excellent flame resistance such as a carbonization length of 1 cm. Further, the flame-resistant fiber bundle obtained from the flame-resistant polymer was pre-carbonized at a temperature of 300 to 800° C. in the nitrogen atmosphere, and carbonization-treated at a temperature of 1400° C. in the nitrogen atmosphere to obtain a carbon fiber bundle. The strength of the resulting carbon fiber bundle was 3600 MPa, the elastic modulus was 230 GPa, and the specific gravity was 1.78.

Example 2

An experiment was performed in the same manner as in Example 1 except that 3.0 parts by weight of p-hydroxybenzoic acid as an acid was used. The average thickness of a film made by the method of "Tensile strength per unit cross-sectional area in water," of the resulting dispersion containing a flame-resistant polymer was 141 µm, and the tensile strength per cross-sectional area was 2.86 MPa. During this, there was neither single yarn breaking nor clogging at a die orifice site. In addition, the concentration of the flame-resistant polymer in the dispersion containing a flame-resistant polymer was 12.2% by weight and, when the flame-resistant polymer isolated from the dispersion containing a flame-resistant polymer was analyzed by 13C-NMR, there was clearly a peak derived from the flame-resistant polymer which is not confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was assessed by spinning by the method of "Assessment of yarn breaking at washing-I," there was 0 mg of single fiber floating or settling in a water bath, and assessment was excellent (⊚). In addition, single fiber breaking or clogging at a die orifice site was not entirely present. Then, when the assessment was performed by spinning by the method of "Assessment of yarn breaking at washing-II," there was 16 mg of a short fiber floating or settling in a water bath, and assessment was good (○). The specific gravity of the dried yarn obtained from this was 1.30, and the elongation of the dried yarn was 3.1%. In addition, the bundle strength of the flame-resistant fiber was 2.3 g/detx, and elongation was 17.5%. When the flame resistance of this fiber was assessed, the bundle became red without burning, and it was seen that it has excellent flame resistance such as a carbonization length of 1.5 cm. Further, the strength of the carbon fiber bundle was 3200 MPa, the elastic modulus was 220 GPa, and the specific gravity was 1.74.

Example 3

An experiment was performed as in Example 1, except that 2.5 parts by weight of monoethanolamine as a cyclizing agent, 7.0 parts by weight of orthonitrotoluene as an oxidizing agent, 3.0 parts by weight of p-hydroxybenzoic acid as an acid, and 77.5 parts by weight of dimethyl sulfoxide as an organic solvent were used. The average thickness of a film made by the method of "Tensile strength per unit cross-sectional area in water," of the resulting dispersion containing a flame-resistant polymer was 130 µm, and the tensile strength per cross-sectional area was 2.46 MPa. During this, there was neither single yarn breaking nor clogging at a dye orifice site. In addition, the concentration of the flame-resistant polymer in the dispersion containing a flame-resistant polymer was 12.1% by weight and, when the flame-resistant polymer isolated from the dispersion containing a flame-resistant polymer was analyzed by 13C-NMR, there was clearly a peak derived from the flame-resistant polymer which was not confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was assessed by spinning by the method of "Assessment of yarn breaking at washing-I," there was 2 mg of single fibers floating or settling in a water bath, and assessment was excellent (⊚). In addition, single fiber breaking or clogging at a die orifice site was not entirely present. Then, when the assessment was performed by spinning by the method of "Assessment of yarn breaking at washing-II," there was 26 mg of short fibers floating or settling in a water bath, and assessment was good (○). The specific gravity of the dried yarn obtained from this was 1.31, and elongation of the dried yarn was 3.0%. In addition, the bundle strength of the flame-resistant fiber was 2.2 g/detx, and elongation was 18.0%. When the flame resistance of this fiber was assessed, the bundle became red without burning, and it was seen that it has excellent flame resistance such as a carbonization length of 1.0 cm. Further, the strength of the carbon fiber bundle was 3250 MPa, the elastic modulus was 235 GPa, and the specific gravity was 1.75.

Example 4

An experiment was performed in the same manner as in Example 1 except that 5.0 parts by weight of benzenesulfonic acid as an acid was used. The average thickness of a film made by the method of "Tensile strength per unit cross-sectional area in water," of the resulting dispersion containing a flame-resistant polymer was 124 µm, and the tensile strength per cross-sectional area was 1.19 MPa. In addition, a concentration of the flame-resistant polymer in the dispersion of a flame-resistant polymer was 12.1% by weight and, when the flame-resistant polymer isolated from the dispersion containing a flame-resistant polymer was analyzed by 13C-NMR, there was clearly a peak derived from the flame-resistant polymer which was confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was assessed by spinning by the method of "Assessment of yarn breaking at washing-I," there was 18 mg of single fibers floating or settling in a water bath, and assessment was good (○). In addition, single fiber breaking or clogging at a die orifice site was not entirely present. Then, when assessment was performed by spinning by the method of "Assessment of yarn breaking at washing-II," there was 45 mg of short fibers floating or settling in a water bath, and assessment was good (○). The specific gravity of the dried yarn obtained from this was 1.32, and elongation of the dried yarn was 2.8%. In addition, the bundle strength of the flame-resistant fiber was 2.0 g/detx, and elongation was 17.5%. When flame resistance of this fiber was assessed, the bundle became red without burning, and it was seen that it has excellent flame resistance such as a carbonization length of 1.0 cm. Further, a strength of the carbon fiber bundle was 3300 MPa, an elastic modulus was 235 GPa, and a specific gravity was 1.74.

Example 5

An experiment was performed in the same manner as in Example 1 except that 0.75 part by weight of terephthalic acid as an acid was used. The average thickness of a film made by the method of "Tensile strength per unit cross-sectional area in water," of the resulting dispersion containing a flame-resistant polymer was 137 μm, and the tensile strength per cross-sectional area was 5.03 MPa. In addition, the concentration of the flame-resistant polymer in the dispersion of the flame-resistant polymer was 12.1% by weight and, when the flame-resistant polymer isolated from the dispersion containing a flame-resistant polymer was analyzed by 13C-NMR, there was clearly a peak derived from the flame-resistant polymer which was confirmed in polyacrylonitrile as a precursor polymer, an organic solvent, or a modifier, at 160 to 180 ppm. In addition, when analyzed by IR, there was a clear peak at 1600 $cm^{-1}$. When this dispersion containing a flame-resistant polymer was spun by the methods of "Assessment of yarn breaking at washing-I" and "Assessment of yarn breaking at washing-II," a dry mass of a single fiber floating or settling in a water bath was 0 mg in both methods, and assessment of both of them was excellent (◉). A specific gravity of the dried yarn obtained from this was 1.34, and elongation of the dried yarn was 3.0%. In addition, the bundle strength of the flame-resistant fiber was 2.5 g/detx, and elongation was 16.0%. When flame resistance of this fiber was assessed, the bundle became red without burning, and it was seen that it has excellent flame resistance such as a carbonization length of 1.0 cm. Further, a strength of the carbon fiber bundle was 3800 MPa, an elastic modulus was 240 GPa, and a specific gravity was 1.76.

Example 6

An experiment was performed in the same manner as in Example 1 except that 0.75 part by weight of adipic acid as an acid was used. The average thickness of a film made by the method of "Tensile strength per unit cross-sectional area in water," of the resulting dispersion containing a flame-resistant polymer was 125 μm, and the tensile strength per cross-sectional area was 3.19 MPa. In addition, a concentration of the flame-resistant polymer in the dispersion of the flame-resistant polymer was 12.2% by weight and, when the flame-resistant polymer isolated from the dispersion containing a flame-resistant polymer was analyzed by 13C-NMR, there was clearly a peak derived from the flame-resistant polymer which was confirmed in polyacrylonitrile as a precursor polymer, an organic solvent, or a modifier, at 160 to 180 ppm. In addition, when analyzed by IR, there was a clear peak at 1600 $cm^{-1}$. When this dispersion containing a flame-resistant polymer was assessed by spinning by the method of "Assessment of yarn breaking at washing-I," there was 0 mg of single fibers floating or settling in a water bath, and assessment was good (◉). In addition, single fiber breaking or clogging at a die orifice site was not entirely present. Then, when assessment was performed by spinning by the method of "Assessment of yarn breaking at washing-II," there was 8 mg of short fibers floating or settling in a water bath, and assessment was good (◉). Further, a strength of the carbon fiber bundle was 3210 MPa, an elastic modulus was 220 GPa, and a specific gravity was 1.78.

Example 7

According to the same manner as that of Example 1 except that an acid was not added, and 2.0 parts by weight of phthalic anhydride was added, an experiment was performed. The average thickness of a film made by the method of "Tensile strength per unit cross-sectional area in water," of the resulting dispersion containing a flame-resistant polymer was 136 μm, and the tensile strength per cross-sectional area was 2.09 MPa. In addition, the concentration of the flame-resistant polymer in the dispersion containing a flame-resistant polymer was 12.1% by weight and, when the flame-resistant polymer isolated from the dispersion containing a flame-resistant polymer was analyzed by 13C-NMR, there was clearly a peak derived from the flame-resistant polymer which was not confirmed in polyacrylonitrile as a precursor polymer, an organic solvent, or a modifier, at 160 to 180 ppm. In addition, when analyzed by IR, there was a clear peak at 1600 $cm^{-1}$. When this dispersion containing a flame-resistant polymer was assessed by spinning by the method of "Assessment of yarn breaking at washing-I," there was 2 mg of single fibers floating or settling in a water bath, and assessment was excellent (◉). In addition, single fiber breaking or clogging at a dye orifice site was not entirely present. Then, when assessment was performed by spinning by the method of "Assessment of yarn breaking at washing-II," there was 16 mg of short fibers floating or settling in a water bath, and assessment was good (○). The strength of the carbon fiber bundle obtained from this was 3200 MPa, the elastic modulus was 230 GPa, and the specific gravity was 1.71.

Example 8

According to the same manner as that of Example 1 except that an acid was not added, and 3.0 parts by weight of benzoyl chloride was added, an experiment was performed. The average thickness of a film made by the method of "Tensile strength per unit cross-sectional area in water," of the resulting dispersion containing a flame-resistant polymer was 140 μm, and the tensile strength per cross-sectional area was 2.79 MPa. In addition, the concentration of the flame-resistant polymer in the dispersion containing a flame-resistant polymer was 12.3% by weight and, when the flame-resistant polymer isolated from the dispersion containing a flame-resistant polymer was analyzed by 13C-NMR, there was clearly a peak derived from the flame-resistant polymer which was not confirmed in polyacrylonitrile as a precursor polymer, an organic solvent, or a modifier, at 160 to 180 ppm. In addition, when analyzed by IR, there was a clear peak at 1600 $cm^{-1}$. When this dispersion containing a flame-resistant polymer was assessed by spinning by the method of "Assessment of yarn breaking at washing-I," there was 3 mg of single fibers floating or settling in a water bath, and assessment was excellent (◉). In addition, single fiber breaking or clogging at a dye orifice site was not entirely present. Then, when assessment was performed by spinning by the method of "Assessment of yarn breaking at washing-II," there was 18 mg of short fibers floating or settling in a water bath, and assessment was good (○). The strength of the carbon fiber bundle obtained from this was 3150 MPa, the elastic modulus was 210 GPa, and the specific gravity was 1.73.

Example 9

An experiment was performed in the same manner as in Example 1 except that 0.1 part by weight of taurine as an acid was used. The average thickness of a film made by the method of "Tensile strength per unit cross-sectional area in water," of the resulting dispersion containing a flame-resistant polymer was 125 μm, and the tensile strength per cross-sectional area was 4.93 MPa. In addition, the concentration of the flame-resistant polymer in the dispersion of a flame-resistant polymer was 12.4% by weight and, when the flame-resistant polymer isolated from the dispersion containing a flame-resistant polymer was analyzed by 13C-NMR, there was clearly a peak derived from the flame-resistant polymer which was confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was assessed by spinning by the method of "Assessment of yarn breaking at washing-I," there was 0 mg of single fibers floating or settling in a water bath, and assessment was good (◎). In addition, single fiber breaking or clogging at a die orifice site was not entirely present. Then, when assessment was performed by spinning by the method of "Assessment of yarn breaking at washing-II," there was 4 mg of short fibers floating or settling in a water bath, and assessment was good (◎). Thereafter, an aminosilicone lubricant was imparted, and the yarn was dried at a temperature of 220° C. for 4 minutes in a hot air circulating furnace. The specific gravity of the dried yarn was 1.32, and the elongation of the dried yarn was 3.1%. Further, the dried yarn was stretched 1.5-fold and, at the same time, heat-treated at a temperature of 300° C. for 3 minutes in a hot air circulating furnace to obtain a flame-resistant fiber bundle. The fineness of a single yarn in the resulting flame-resistant fiber bundle was 1.0 dtex, the strength was 2.4 g/dtex, and the elongation was 15%. In addition, when flame resistance was assessed, the bundle became red without burning, and it was seen that the yarn has excellent flame resistance such as a carbonization length of 1 cm. Further, this was carbonized by the same method as that of Example 1, the strength of the resulting carbon fiber bundle was 3330 MPa, and the elastic modulus was 298 GPa, and the specific gravity was 1.78.

Example 10

An experiment was performed as in Example 1 except that 0.5 parts by weight of sulfanilic acid as an acid was used. The average thickness of a film made by the method of "Tensile strength per unit cross-sectional area in water," of the resulting dispersion containing a flame-resistant polymer was 127 μm, and the tensile strength per cross-sectional area was 5.08 MPa. In addition, the concentration of the flame-resistant polymer in the dispersion of the flame-resistant polymer was 12.6% by weight and, when the flame-resistant polymer isolated from the dispersion containing a flame-resistant polymer was analyzed by 13C-NMR, there was clearly a peak derived from the flame-resistant polymer which was confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was assessed by spinning by the method of "Assessment of yarn breaking at washing-I," there was 0 mg of single fibers floating or settling in a water bath, and assessment was good (◎). In addition, single fiber breaking or clogging at a die orifice site was not entirely present. Then, when assessment was performed by spinning by the method of "Assessment of yarn breaking at washing-II," there was 0 mg of short fibers floating or settling in a water bath, and assessment was good (◎). Further, the specific gravity of the dried yarn obtained this was 1.30, and the elongation of the dried yarn was 3.2%. In addition, the bundle strength of the flame-resistant fiber was 2.5 g/detx, and the elongation was 18.0%. When flame resistance of this fiber was assessed, the bundle became red without burning, and it was seen that it has excellent flame resistance such as a carbonization length of 1.0 cm. Further, the strength of the carbon fiber bundle was 3520 MPa, the elastic modulus was 267 GPa, and the specific gravity was 1.77.

Example 11

According to the same manner as that of Example 1 except that 2.0 parts by weigh of monoethanolamine as a cyclizing agent, 1.5 parts by weight of nitrobenzene as an oxidizing agent, and 0.3 part by weight of taurine as an acid were added, an experiment was performed. The average thickness of a film made by the method of "Tensile strength per unit cross-sectional area in water," of the resulting dispersion containing a flame-resistant polymer was 125 μm, and the tensile strength per cross-sectional area was 5.91 MPa. In addition, the concentration of the flame-resistant polymer in the dispersion of the flame-resistant polymer was 12.3% by weight and, when the flame-resistant polymer isolated from the dispersion containing a flame-resistant polymer was, there was a clear peak at 1600 cm$^{-1}$. When this dispersion containing a flame-resistant polymer was assessed by spinning by the method of "Assessment of yarn breaking at washing-I," there was 0 mg of single fibers floating or settling in a water bath, and assessment was excellent (◎). In addition, single fiber breaking or clogging at a die orifice site was not entirely present. Then, when the assessment was performed by spinning by the method of "Assessment of yarn breaking at washing-II," there was 0 mg of short fibers floating or settling in a water bath, and assessment was excellent (◎). Further, the specific gravity of the dried yarn obtained this was 1.32, and the elongation of the dried yarn was 3.0%. In addition, the bundle strength of the flame-resistant fiber was 2.3 g/detx, and the elongation was 19.0%. When flame resistance of this fiber was assessed, the bundle became red without burning, and it was seen that it has excellent flame resistance such as a carbonization length of 3.0 cm. Further, the strength of the carbon fiber bundle was 3100 MPa, the elastic modulus was 240 GPa, and the specific gravity was 1.79.

Example 12

According to the same manner as that of Example 1 except that 2.5 parts by weigh of monoethanolamine as a cyclizing agent, 1.2 parts by weight of nitrobenzene as an oxidizing agent, and 0.2 part by weight of taurine as an acid were added, an experiment was performed. The average thickness of a film made by the method of "Tensile strength per unit cross-sectional area in water," of the resulting dispersion containing a flame-resistant polymer was 135 μm, and the tensile strength per cross-sectional area was 4.00 MPa. In addition, the concentration of the flame-resistant polymer in the dispersion of a flame-resistant polymer was 12.2% by weight and, when the flame-resistant polymer isolated from the dispersion containing a flame-resistant polymer was, there was a clear peak at 1600 cm$^{-1}$. When this dispersion containing a flame-resistant polymer was assessed by spinning by the method of "Assessment of yarn breaking at washing-I," there was 1 mg of single fibers floating or settling in a water bath, and assessment was excellent (⊚). In addition, single fiber breaking or clogging at a die orifice site was not entirely present. Then, when the assessment was performed by spinning by the method of "Assessment of yarn breaking at washing-II," there was 5 mg of short fibers floating or settling in a water bath, and assessment was excellent (⊚). Further, the specific gravity of the dried yarn obtained this was 1.31, and the elongation of the dried yarn was 3.1%. In addition, the bundle strength of the flame-resistant fiber was 2.2 g/detx, and the elongation was 19.0%. When flame resistance of this fiber was assessed, the bundle became red without burning, and it was seen that it has excellent flame resistance such as a carbonization length of 4.0 cm. Further, the strength of the carbon fiber bundle was 3020 MPa, the elastic modulus was 250 GPa, and the specific gravity was 1.78.

Example 13

An experiment was performed as in Example 1 except that 0.75 part by weight of phthalic acid as an acid was used. The average thickness of a film made by the method of "Tensile strength per unit cross-sectional area in water," of the resulting dispersion containing a flame-resistant polymer was 145 μm, and the tensile strength per cross-sectional area was 4.96 MPa. In addition, the concentration of the flame-resistant polymer in the dispersion of a flame-resistant polymer was 12.4% by weight and, when the flame-resistant polymer isolated from the dispersion containing a flame-resistant polymer was analyzed by 13C-NMR, there was clearly a peak derived from the flame-resistant polymer which was confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was assessed by spinning by the method of "Assessment of yarn breaking at washing-I," there was 1 mg of single fibers floating or settling in a water bath, and assessment was good (⊚). In addition, single fiber breaking or clogging at a die orifice site was not entirely present. Then, when assessment was performed by spinning by the method of "Assessment of yarn breaking at washing-II," there was 3 mg of short fibers floating or settling in a water bath, and assessment was good (⊚). The specific gravity of the dried yarn obtained this was 1.30, and the elongation of the dried yarn was 3.0%. In addition, the bundle strength of the flame-resistant fiber was 2.2 g/detx, and the elongation was 18.5%. When flame resistance of this fiber was assessed, the bundle became red without burning, and it was seen that it has excellent flame resistance such as a carbonization length of 1.5 cm. Further, the strength of the carbon fiber bundle was 3250 MPa, the elastic modulus was 235 GPa, and the specific gravity was 1.76.

Comparative Example 1

A solution in which 10 parts by weight of an acrylonitrile homopolymer as a precursor polymer, 3.5 parts by weight of monoethanolamine as a cyclizing agent, and 8.0 parts by weight of orthonitrotoluene as an oxidizing agent were dissolved in 74.0 parts by weight of dimethyl sulfoxide as an organic solvent was stirred at a temperature of 150° C. for 8 hours, and cooled to a temperature of 30° C. to obtain a dispersion in which the flame-resistant polymer was dispersed. The average thickness of a film made by the method of "Tensile strength were unit-sectional area in water" of the resulting dispersion containing a flame-resistant polymer was 143 μm, and the tensile strength per cross-sectional area was 0.3 MPa. In addition, the concentration of the flame-resistant polymer in the dispersion of a flame-resistant polymer was 12.1% by weight and, when the flame-resistant polymer isolated from the dispersion containing a flame-resistant polymer was analyzed by 13C-NMR, there was clearly a peak derived from the flame-resistant polymer which was not confirmed in polyacrylonitrile as a precursor polymer, an organic solvent, or a modifier, at 160 to 180 ppm. In addition, when analyzed by IR, there was a clear peak at 1600 cm$^{-1}$. When this dispersion containing a flame-resistant polymer was spun by the method of "Assessment of yarn breaking at washing-I," the dry mass of single fibers floating or settling in the water bath was 68 mg, and assessment was worse (x). The specific gravity of the dried yarn obtained from this was 1.28, and elongation of the dried yarn was 2.1%. In addition, the bundle strength of the flame-resistant fiber was 1.4 g/detx, and the elongation was 13.0%. When flame resistant of this fiber was assessed, it became red without burning, and it was seen that it has excellent flame resistance such as a carbonization length of 1.5 cm. Further, the strength of the carbon fiber bundle was 1500 MPa, the elastic modulus was 145 GPa, and the specific gravity was 1.72.

Thus, when the dispersion in which an acrylonitrile polymer was dispersed in a polar solvent was heat-treated under the condition of the absence of all of an acid, an acid anhydride and an acid chloride, sufficient flame resistance can be imparted to an acrylonitrile polymer, but when treated under the condition of the absence of all of an acid, an acid anhydride, and an acid chloride, a sufficient strength cannot be obtained upon shaping of the flame-resistant polymer into a yarn, yarn breaking occurs frequently at steps, and it is clear that physical properties of the resulting flame-resistant yarn and carbon fiber are remarkably reduced.

TABLE 1

|  |  |  |  | Example | | | | | | |
|---|---|---|---|---|---|---|---|---|---|---|
|  |  |  |  | 1 | 2 | 3 | 4 | 5 | 6 | 7 |
| Raw material | Precursor polymer | Acrylonitrile homopolymer | Part | 10.0 | 10.0 | 10.0 | 10.0 | 10.0 | 10.0 | 10.0 |
|  | Organic solvent | Dimethyl sulfoxide | Part | 75.5 | 75.5 | 77.5 | 75.5 | 75.5 | 75.5 | 75.5 |
|  | Cyclizing agent | Monoethanolamine | Part | 3.5 | 3.5 | 2.5 | 3.5 | 3.5 | 3.5 | 3.5 |
|  | Oxidizing agent | Orthonitrotoluene | Part | 8.0 | 8.0 | 7.0 | 8.0 | 8.0 | 8.0 | 8.0 |

TABLE 1-continued

| | | | | | | | | | | |
|---|---|---|---|---|---|---|---|---|---|---|
| | | Nitrobenzene | Part | — | — | — | — | — | — | — |
| | | Orthonitrophenol | Part | — | — | — | — | — | — | — |
| | Acid (monocarboxylic acid) | Benzoic acid | Part | 3.0 | — | — | — | — | — | — |
| | | p-hydroxybenzoic acid | Part | — | 3.0 | 3.0 | — | — | — | — |
| | Acid (Dicarboxylic acid) | Phthalic acid | Part | — | — | — | — | — | — | — |
| | | Terephthalic acid | Part | — | — | — | — | 0.75 | — | — |
| | | Adipic acid | Part | — | — | — | — | — | 0.75 | — |
| | Acid (sulfonic acid) | Benzenesulfonic acid | Part | — | — | — | 5.0 | — | — | — |
| | Acid (aminosulfonic acid) | Taurine | Part | — | — | — | — | — | — | — |
| | | Sulfanilic acid | Part | — | — | — | — | — | — | — |
| | Acid anhydride | Phthalic anhydride | Part | — | — | — | — | — | — | 2.0 |
| | Acid chloride | Benzoyl chloride | Part | — | — | — | — | — | — | — |
| Flame-resistant polymer/properties | | Average thickness of film | μm | 141 | 141 | 130 | 124 | 137 | 125 | 136 |
| | | Tensile strength per cross-sectional area | Npa | 3.15 | 2.86 | 2.46 | 1.19 | 5.03 | 3.19 | 2.09 |
| | | Concentration of flame-resistant polymer | % | 12.1 | 12.2 | 12.1 | 12.1 | 12.1 | 12.2 | 12.1 |
| | 13C-NMR | Peak at 160 to 180 ppm | Presence/Absence | Presence | Presence | Presence | Presence | Presence | Presence | Presence |
| | IR | Peak at 1600 cm−1 | Presence/Absence | Presence | Presence | Presence | Presence | Presence | Presence | Presence |
| | | Assessment of yarn breaking at washing 1 | ◎/○/X | ◎ | ◎ | ◎ | ○ | ◎ | ◎ | ◎ |
| | | Assessment of yarn breaking at washing 2 | ◎/○/X | ◎ | ○ | ○ | ○ | ◎ | ◎ | ○ |
| | | Specific gravity of dried yarn | — | 1.30 | 1.30 | 1.31 | 1.32 | 1.34 | — | — |
| | | Elongation of dried yarn | % | 3.0 | 3.1 | 3.0 | 2.8 | 3.0 | — | — |
| | | Flame-resistant fiber bundle strength | gf/dtex | 2.3 | 2.3 | 2.2 | 2.0 | 2.5 | — | — |
| | | Elongation | % | 18 | 17.5 | 18.0 | 17.5 | 16.0 | — | — |
| | Flame resistance | Carbonization length | cm | 1 | 1.5 | 1.0 | 1.0 | 1.0 | — | — |
| Carbon fiber properties | | Strength | Mpa | 3600 | 3200 | 3250 | 3300 | 3800 | 3210 | 3200 |
| | | Elastic modulus | Gpa | 230 | 220 | 235 | 235 | 240 | 220 | 230 |
| | | Specific gravity | — | 1.78 | 1.74 | 1.75 | 1.74 | 1.76 | 1.78 | 1.71 |

| | | | | Example | | | | | | Comparative Example |
|---|---|---|---|---|---|---|---|---|---|---|
| | | | | 8 | 9 | 10 | 11 | 12 | 13 | 1 |
| Raw material | Precursor polymer | Acrylonitrile homopolymer | Part | 10.0 | 10.0 | 10.0 | 10.0 | 10.0 | 10.0 | 10.0 |
| | Organic solvent | Dimethyl sulfoxide | Part | 75.5 | 75.5 | 75.5 | 75.5 | 75.5 | 75.5 | 74.0 |
| | Cyclizing agent | Monoethanolamine | Part | 3.5 | 3.5 | 3.5 | 2.0 | 2.5 | 3.5 | 3.5 |
| | Oxidizing agent | Orthonitrotoluene | Part | 8.0 | 8.0 | 8.0 | — | — | 8.0 | 8.0 |
| | | Nitrobenzene | Part | — | — | — | 1.5 | — | — | — |
| | | Orthonitrophenol | Part | — | — | — | — | 1.2 | — | — |
| | Acid (monocarboxylic acid) | Benzoic acid | Part | — | — | — | — | — | — | — |
| | | p-hydroxybenzoic acid | Part | — | — | — | — | — | — | — |
| | Acid (Dicarboxylic acid) | Phthalic acid | Part | — | — | — | — | — | 0.75 | — |

TABLE 1-continued

| | | | 1 | 2 | 3 | 4 | 5 | 6 | 7 |
|---|---|---|---|---|---|---|---|---|---|
| | | Terephthalic acid | Part | — | — | — | — | — | — | — |
| | | Adipic acid | Part | — | — | — | — | — | — | — |
| | Acid (sulfonic acid) | Benzene-sulfonic acid | Part | — | — | — | — | — | — | — |
| | Acid (amino-sulfonic acid) | Taurine | Part | — | 0.1 | — | 0.3 | 0.2 | — | — |
| | | Sulfanilic acid | Part | — | — | 0.5 | — | — | — | — |
| | Acid anhydride | Phthalic anhydride | Part | — | — | — | — | — | — | — |
| | Acid chloride | Benzoyl chloride | Part | 3.0 | — | — | — | — | — | — |
| Flame-resistant polymer/ properties | | Average thickness of film | μm | 140 | 125 | 127 | 125 | 135 | 145 | 143 |
| | | Tensile strength per cross-sectional area | Npa | 2.79 | 4.93 | 5.08 | 5.91 | 4.00 | 4.96 | 0.30 |
| | | Concentration of flame-resistant polymer | % | 12.3 | 12.4 | 12.6 | 12.3 | 12.2 | 12.4 | 12.1 |
| | 13C-NMR | Peak at 160 to 180 ppm | Presence/Absence | Presence | Presence | Presence | Presence | Presence | Presence | Presence |
| | IR | Peak at 1600 cm−1 | Presence/Absence | Presence | Presence | Presence | Presence | Presence | Presence | Presence |
| | | Assessment of yarn breaking at washing 1 | ◎/○/X | ◎ | ◎ | ◎ | ◎ | ◎ | ◎ | X |
| | | Assessment of yarn breaking at washing 2 | ◎/○/X | ○ | ◎ | ◎ | ◎ | ◎ | ◎ | X |
| | | Specific gravity of dried yarn | — | — | 1.32 | 1.30 | 1.32 | 1.31 | 1.30 | 1.28 |
| | | Elongation of dried yarn | % | — | 3.1 | 3.2 | 3.0 | 3.1 | 3.0 | 2.1 |
| | | Flame-resistant fiber bundle strength | gf/dtex | — | 2.4 | 2.5 | 2.3 | 2.2 | 2.2 | 1.4 |
| | | Elongation | % | — | 15 | 18.0 | 19.0 | 19.0 | 18.5 | 13.0 |
| | Flame resistance | Carbonization length | cm | — | 1 | 1.0 | 3.0 | 4.0 | 1.5 | 1.5 |
| Carbon fiber propeerties | | Strength | Mpa | 3150 | 3330 | 3520 | 3100 | 3020 | 3250 | 1500 |
| | | Elastic modulus | Gpa | 210 | 298 | 267 | 240 | 250 | 235 | 145 |
| | | Specific gravity | — | 1.73 | 1.78 | 1.77 | 1.79 | 1.78 | 1.76 | 1.72 |

INDUSTRIAL APPLICABILITY

The dispersion containing a flame-resistant polymer has remarkably good release from an ejection port upon shaping it. Thus, in the dispersion containing a flame-resistant polymer, particularly, since release from an ejection die orifice site becomes good upon shaping into a yarn, it becomes possible to suppress single yarn breaking and adhesion at the ejection die orifice site and, further, since a shaped article having a high physical strength at coagulation is obtained, damage of the shaped article is considerably reduced in a step of removing a dispersing medium remaining in the shaped article, that is, a washing stage, a step rate can be improved, being useful.

The invention claimed is:

1. A dispersion comprising 1) a flame-resistant polymer obtained by heat-treating an acrylonitrile polymer as a precursor polymer dispersed in 2) a polar organic solvent in the presence of at least an acid, an acid anhydride or an acid chloride and 3) an oxidizing agent,
   wherein an in-water tensile strength per unit cross-sectional area of the flame-resistant polymer is 1.0 MPa or more and 6.5 MPa or less,
   a total additional amount of the acid is 0.05 part by weight to 5.0 parts by weight based on 10.0 parts by weight of the acrylonitrile polymer, and
   wherein the acid is a monocarboxylic acid selected from the group consisting of benzoic acid, hydroxybenzoic acid, methylbenzoic acid and aminobenzoic acid, a dicarboxylic acid selected from the group consisting of phthalic acid, isophthalic acid and terephthalic acid, or an aminosulfonic acid which is taurine or sulfanilic acid.

2. A flame-resistant fiber comprising a shaped dispersion, wherein the dispersion is the dispersion containing a flame-resistant polymer of claim 1.

3. A carbon fiber comprising a carbonized flame-resistant fiber, wherein the flame-resistant fiber is the flame-resistant fiber of claim 2.

4. The dispersion according to claim 1, further comprising a cyclizing agent.

* * * * *